United States Patent
Alresaini et al.

(10) Patent No.: US 9,444,751 B1
(45) Date of Patent: Sep. 13, 2016

(54) BACKPRESSURE WITH ADAPTIVE REDUNDANCY

(71) Applicant: University of Southern California, Los Angeles, CA (US)

(72) Inventors: Majed Alresaini, Rosemead, CA (US); Bhaskar Krishnamachari, Los Angeles, CA (US); Michael J. Neely, South Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 102 days.

(21) Appl. No.: 13/956,143

(22) Filed: Jul. 31, 2013

Related U.S. Application Data

(60) Provisional application No. 61/679,326, filed on Aug. 3, 2012.

(51) Int. Cl.
| | |
|---|---|
| H04L 12/835 | (2013.01) |
| H04L 12/861 | (2013.01) |
| H04L 12/721 | (2013.01) |
| H04L 12/833 | (2013.01) |

(52) U.S. Cl.
CPC ............ *H04L 47/30* (2013.01); *H04L 45/32* (2013.01); *H04L 47/2458* (2013.01); *H04L 49/9084* (2013.01)

(58) Field of Classification Search
None
See application file for complete search history.

(56) References Cited

U.S. PATENT DOCUMENTS

| | | |
|---|---|---|
| 5,689,500 A | 11/1997 | Chiussi et al. |
| 7,151,744 B2 | 12/2006 | Sarkinen et al. |

FOREIGN PATENT DOCUMENTS

| | | |
|---|---|---|
| WO | WO 2005/048543 | 5/2005 |
| WO | WO 2008/008865 | 1/2008 |

OTHER PUBLICATIONS

Ryu et al, "Timescale Decoupled Routing and Rate Control in Intermittently Connected Networks", IEEE/ACM Transactions on Networking, vol. 20, No. 4, Aug. 2012, pp. 1138-1151.*

Bai and A. Helmy, "Impact of mobility on last encounter routing protocols," IEEE SECON, 2007, 461-470.

Bui et al., "Novel architectures and algorithms for delay reduction in back-pressure scheduling and routing," IEEE INFOCOM, 2009, 2936-2940.

Cao and Sun, "Routing in Delay/Disruption Tolerant Networks: A Taxonomy, Survey and Challenges," IEEE Communication Surveys & Tutorials, 2012, 24 pages.

Dubois-Ferriere et al., "Age matters: efficient route discovery in mobile ad hoc networks using encounter ages," ACM MobiHoc, 2003, 257-266.

Dvir and Vasilakos, "Backpressure-based routing protocol for DTNs," ACM SIGCOMM, 2010, 405-406.

(Continued)

*Primary Examiner* — Awet Haile
*Assistant Examiner* — Kent Krueger
(74) *Attorney, Agent, or Firm* — Fish & Richardson P.C.

(57) ABSTRACT

Routing technologies are disclosed. A described technology includes routing packets through a network based on backpressure scheduling; when a number of packets in a transmitter queue satisfies a first threshold, retaining copies of at least a portion of the packets; and once the number of packets in the transmitter queue satisfies a second threshold, transmitting the retained copies of the packets to perform the routing. Retaining the copies can include copying a packet from the transmitter queue into a duplicate buffer when the number of packets in the transmitter queue is below the first threshold.

31 Claims, 9 Drawing Sheets

(56) References Cited

OTHER PUBLICATIONS

Elwhishi and Ho, "SARP—a novel multi-copy routing protocol for intermittently connected mobile networks," IEEE GLOBECOM, 2009, 7 pages.

Georgiadis et al., "Resource allocation and cross-layer control in wireless networks," Foundations and Trends in Networking, 2006, 1(1), 146 pages.

Grossglauser and Vetterli, "Locating mobile nodes with ease: learning efficient routes from encounter histories alone," IEEE/ACM Transactions on Networking, 2006, 14(3):457-469.

Huang and Neely, "Delay reduction via lagrange multipliers in stochastic network optimization," IEEE Transactions on Automatic Control, 2011, 56(4), 10 pages.

Huang et al., "LIFO-backpressure achieves near optimal utility-delay tradeoff," IEEE WiOpt, 2011, 70-77.

Ji et al., "Delay-based back-pressure scheduling in multi-hop wireless networks," IEEE INFOCOM, 2011, 2579-2587.

Jin et al., "Handling inelastic traffic in multi-hop wireless networks," IEEE JSAC, 2010, 28(7):1105-1115.

Johnson and Maltz, "Dynamic source routing in ad hoc wireless networks," Mobile computing, vol. 353, 1996, 18 pages.

Lin et al., "A tutorial on cross-layer optimization in wireless networks," IEEE Journal on Selected Areas in Communications, Aug. 2006, 24(8):1452-1463.

Moeller et al., "Backpressure Routing Made Practical," IEEE INFOCOM, 2010, 2 pages.

Moeller et al., "Routing without routes: the backpressure collection protocol," ACM/IEER IPSN, 2010, 12 pages.

Naghshvar and Javidi, "Opportunistic routing with congestion diversity in wireless multi-hop networks," IEEE INFOCOM, 2010, 5 pages.

Neely and Modiano, "Capacity and delay tradeoffs for ad hoc mobile networks," IEEE Transactions on Information Theory, Jun. 2005, 51(6):1917-1937.

Neely and Urgaonkar, "Optimal backpressure routing for wireless networks with multi-receiver diversity," Ad Hoc Networks, Jul. 2009, 7(5): 862-881.

Neely, "Intelligent packet dropping for optimal energy-delay tradeoffs in wireless downlinks," IEEE Transactions on Automatic Control, Mar. 2009, 54(3):565-579.

Neely, *Stochastic network optimization with application to communication and queueing systems*, Synthesis Lectures on Communication Networks, 2010, 211 pages.

Neely, "Super-fast delay tradeoffs for utility optimal fair scheduling in wireless networks," IEEE Journal on Selected Areas in Communications, Aug. 2006, 24(8):1489-1501.

Neely et al., "Dynamic power allocation and routing for time varying wireless networks," IEEE Journal on Selected Areas in Communications, Jan. 2005, 23(1):89-103.

Neely and Urgaonkar, "Opportunism, Backpressure, and Stochastic Optimization with the Wireless Broadcast Advantage," Asilomar, 2008, 2152-2158.

Perkins and E. Royer, "Ad-hoc on-demand distance vector routing," IEEE WMCSA, 2009, 11 pages.

Rotti, "Opportunistic Lookahead Routing Protocol for Delay Tolerant Networks," Thesis, Louisiana State University, Dec. 2012, 66 pages.

Ryu et al., "Back-pressure routing for intermittently connected networks," INFOCOM Proceedings IEEE, Mar. 2010, 5 pages.

Ryu, "Congestion Control and Routing over Challenged Networks," Dissertation, University of Texas at Austin, May 2012, 185 pages.

Ryu et al., "Back-pressure routing and rate control for ICNs," ACM Mobicom, 2010, 365-376.

Spyropoulos et al., "Efficient routing in intermittently connected mobile networks: The single-copy case," IEEE/ACM Transactions on Networking, Feb. 2008, 16(1):63-76.

Spyropoulos et al., "Efficient routing in intermittently connected mobile networks: the multiple-copy case," IEEE/ACM Transactions on Networking, Feb. 2008, 16(1):77-90.

Spyropoulos et al., "Spray and wait: an efficient routing scheme for intermittently connected mobile networks," in ACM SIGCOMM, 2005, 252-259.

Spyropoulos et al., "Routing for disruption tolerant networks: taxonomy and design," Wireless Networks, 2010, vol. 16, 21 pages.

Sridharan et al., "Implementing backpressure-based rate control in wireless networks," ITA Workshop, 2009, 5 pages.

Tassiulas and Ephremides, "Stability properties of constrained queueing systems and scheduling policies for maximum throughput in multihop radio networks," IEEE Transactions on Automatic Control, 1992, 37(12):1936-1948.

Vandat and Becker, "Epidemic routing for partially-connected ad hoc networks," Duke University, Tech. Rep., 2000, 14 pages.

Warner et al, "DiffQ: Practical differential backlog congestion control for wireless networks," IEEE INFOCOM, 2009, 262-270.

Ying et al., "Cluster-Basted Back-Pressure Routing Algorithm," IEEE INFOCOM, 2008, 1157-1165.

Ying et al., "On combining shortest-path and back-pressure routing over multihop wireless networks," IEEE/ACM Transactions on Networking, Jun. 2011, 19(3):841-854.

\* cited by examiner

BACKPRESSURE WITH ADAPTIVE REDUNDANCY

CROSS REFERENCE TO RELATED APPLICATION

This patent document claims the benefit of priority from U.S. provisional application No. 61/679,326 entitled "BACKPRESSURE WITH ADAPTIVE REDUNDANCY (BWAR)" and filed on Aug. 3, 2012, which is incorporated herein by reference in its entirety.

STATEMENT AS TO FEDERALLY SPONSORED RESEARCH

This invention was made with government support under Contract No. 1049541 awarded by the National Science Foundation (NSF) and under Contract No. W911NF-09-2-0053 awarded by Network Science Collaborative Technology Alliance sponsored by the U.S. Army Research Laboratory. The government has certain rights in the invention.

FIELD

This patent document generally relates to routing technology.

BACKGROUND

Queue-differential backpressure scheduling and routing has been shown to be throughput optimal in terms of being able to stabilize the network under any feasible traffic rate vector. Additional research has extended the original result to show that backpressure techniques can be combined with utility optimization, resulting in simple, throughput-optimal, cross-layer network protocols for all kinds of networks. Recently, some of these techniques have been translated to practically implemented routing and rate-control protocols for wireless networks. The basic idea of backpressure mechanisms is to prioritize transmissions over links that have the highest queue differentials. Backpressure effectively makes packets flow through the network as though pulled by gravity towards the destination, which has the smallest queue size of zero.

Some communication networks such as intermittently connected mobile networks (ICMNs), e.g., encounter-based mobile networks or delay/disruption tolerant networks (DTNs), can use routing techniques that take in to consideration the intermittent availability of communication links when routing packets. ICMNs can be wireless networks with sparse mobile nodes in which complete connected end-to-end paths from source to destination rarely exists. As a result of this, traditional routing methods which rely on establishing paths would fail to deliver any packets. Several studies were conducted to overcome this problem by introducing mobility-assisted routing methods, such as single-copy and multi-copy techniques, that use mobility of the nodes to route packets. In these methods, the source stores the packet while moving until it encounters another node that has a better chance to deliver the packet to the destination. When that happens, the source hands the packet to that node which will be in charge to deliver the packet. This node also can encounter another one and so on. The moment of time that a node carries a particular packet is called the custodian of that packet.

Epidemic routing, or sometimes called flooding, in which nodes duplicate and transmit so both transmitter and receiver have copies of the same packet is guaranteed to support optimal delay in the case of having unrealistic infinite bandwidth. When bandwidth is limited however, epidemic routing suffers from large delay due to congestion resulting from large numbers of duplicates. Another method called Spray and Wait (S&W) creates a predefined fixed number of copies of the packet when admitted to the network. Those copies are distributed to distinct nodes and then each copy waits until it encounters the destination.

SUMMARY

This document describes, among other things, technologies relating to routing technology. In one aspect, a described technique includes routing, at a node including hardware and a transmitter queue, packets through a network based on backpressure scheduling; when a number of packets in the transmitter queue satisfies a first threshold, retaining copies of at least a portion of the packets; and once the number of packets in the transmitter queue satisfies a second threshold, transmitting the retained copies of the packets to perform the routing. Other forms of this aspect may include corresponding systems, apparatus, and computer software encoded on a non-transitory computer readable storage medium.

These and other implementations may include one or more of the following features. A network can include an intermittently connected mobile network. The first threshold can be different from the second threshold. Backpressure scheduling can include a store-and-forward protocol in which transmission decisions for the packets are based on queue differentials between the node and target recipient nodes. Retaining the copies can include copying a packet from the transmitter queue into a duplicate buffer when the number of packets in the transmitter queue is below the first threshold upon transmission of the packet from the transmitter queue. A node can include a plurality of transmitter queues and a plurality of duplicate buffers, with a pair of each corresponding to a different destination or flow, the first threshold can include a first set of predefined thresholds for the plurality of transmitter queues, and the second threshold can include a second set of predefined thresholds for the plurality of transmitter queues. In some implementations, the second threshold is zero packets in the transmitter queue. In some implementations, a size of the duplicate buffer and the first threshold are each set to a value corresponding to a maximum link service rate in the network.

Implementations can include removing the duplicate packet from the duplicate buffer once a notification of receipt by a destination node is received or once a predefined timeout has occurred. Implementations can include giving higher priority to packets whose next hop node is their final destination in the network. Implementations can include, when a timeout criteria is met, removing the copies of the packets. Implementations can include modifying the timeout criterion in accordance with feedback obtained from notifications of packet receptions, delay of delivered packets, or other congestion signals from the network. Implementations can include routing, at the node, second packets through the network based on the backpressure scheduling, the second packets being different from the first packets; when the number of packets in the transmitter queue satisfies the first threshold, retaining copies of at least a portion of the second packets; and when a timeout criterion is met without the transmitter queue being emptied since the retaining of the copies of the second packets, removing the copies of the second packets to avoid duplicate packet transmission.

Implementations can include for each packet to have a copy retained, checking that a total number of copies of the packet is bounded by a constant. In some implementations, the constant is adjustable to tune a tradeoff between energy and delay.

In another aspect, a routing technique can include routing, at a node including hardware, packets through a network based on backpressure scheduling, the node including a transmitter queue and a duplicate buffer; when a number of packets in the transmitter queue satisfies a first threshold, retaining copies of at least a portion of the packets; and once the number of packets in the transmitter queue satisfies a second threshold, which is different than the first threshold, transmitting the retained copies of the packets to perform the routing. Retaining the copies can include copying a packet from the transmitter queue into the duplicate buffer when the number of packets in the transmitter queue is below the first threshold. In another aspect, a system can include multiple intermittently connected mobile devices forming an intermittently connected mobile network, wherein a mobile device in the network comprises at least one hardware processor and at least one memory storing a program configured to cause the at least one hardware processor to route first packets through a network based on backpressure scheduling using a transmitter queue, retain copies of at least a portion of the first packets when a number of packets in the transmitter queue satisfies a first threshold, and transmit the retained copies of the first packets to perform the routing once the number of packets in the transmitter queue satisfies a second threshold, which is different than the first threshold.

In yet another aspect, a routing apparatus can include a memory comprising a transmitter queue and a duplicate buffer; and a processor configured to perform operations. The operations can include routing packets through a network based on backpressure scheduling; when a number of packets in the transmitter queue satisfies a first threshold, retaining copies of at least a portion of the packets, wherein retaining the copies comprises copying a packet from the transmitter queue into the duplicate buffer when the number of packets in the transmitter queue is below the first threshold; and once the number of packets in the transmitter queue satisfies a second threshold, which is different than the first threshold, transmitting the retained copies of the packets to perform the routing.

In still another aspect, a system can include multiple intermittently connected mobile devices forming an intermittently connected mobile network. A mobile device in the network can include a processor and a memory. The memory can store a program configured to cause the processor to route packets through a network based on backpressure scheduling using a transmitter queue, retain copies of at least a portion of the packets when a number of packets in the transmitter queue satisfies a first threshold, and transmit the retained copies of the packets to perform the routing once the number of packets in the transmitter queue satisfies a second threshold, which is different than the first threshold. The program can be configured to retain the copies by at least copying a packet from the transmitter queue into a duplicate buffer when the number of packets in the transmitter queue is below the first threshold. The mobile device can include a plurality of transmitter queues and a plurality of duplicate buffers, with a pair of each corresponding to a different destination or flow. The first threshold can include a first set of predefined thresholds for the plurality of transmitter queues. The second threshold can include a second set of predefined thresholds for the plurality of transmitter queues.

Particular configurations of the technology described in this document can be implemented so as to realize one or more of the following potential advantages. BWAR technology can provide an enhanced backpressure algorithm that introduces adaptive redundancy to improve delay performance. BWAR technology can enhance backpressure routing for networks such as ICMN during both low and high data traffic loads and has efficient delay and energy properties, and provides increased throughput. BWAR can outperform traditional backpressure (at low loads) and conventional DTN-routing mechanisms (at high loads) in encounter-based mobile networks. BWAR technology can be used in various networks such as communication networks, sensor networks, disaster recovery networks, vehicular networks, wildlife tracking, and military networks.

Details of one or more implementations of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
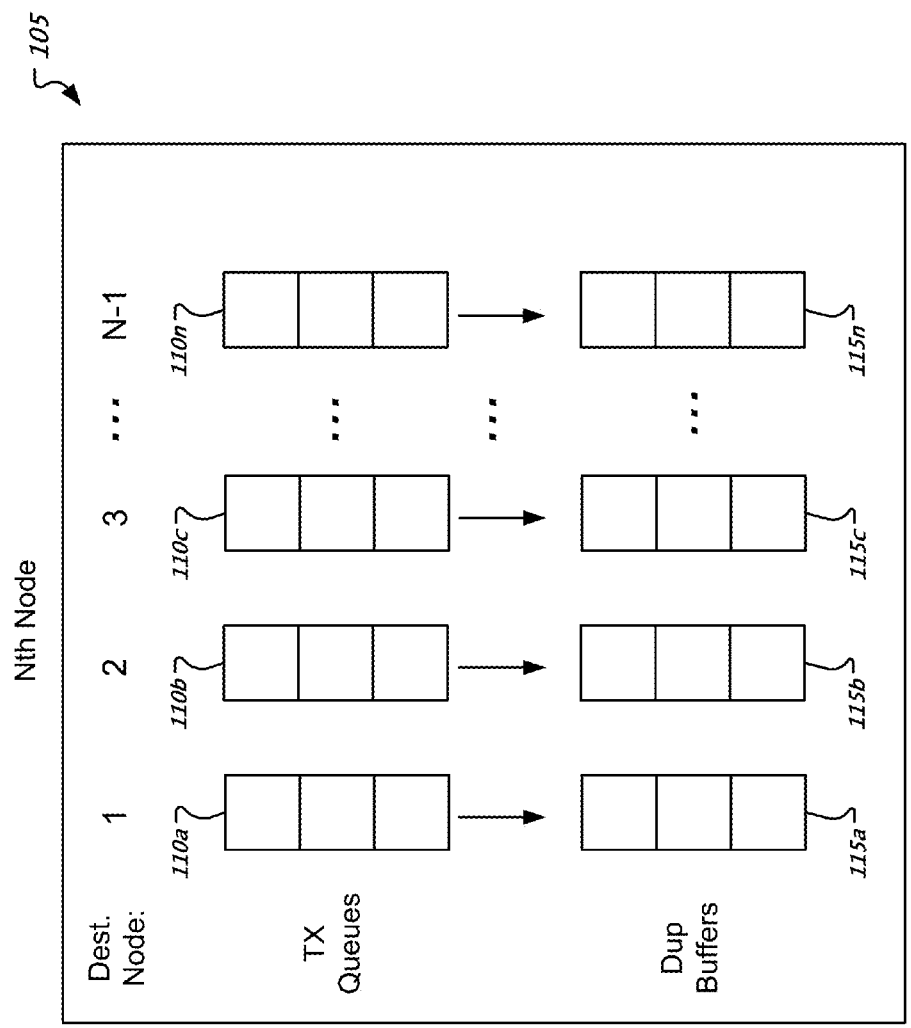
FIG. 1 shows a diagram of a node architecture that is based on BWAR.

Nodes within a network can generate and/or route packets within the network. A packet may have to be routed via one or more nodes to reach a destination node. Further, there may exist different pathways through the network for which a packet can reach its intended destination. The network's nodes can perform backpressure scheduling and routing within discretized chunks of time called timeslots. Backpressure scheduling and routing can be performed to affect various metrics such as network throughput, which measures how much data traffic load a network can handle and deliver successfully to intended destinations as a unit of bits per second, and network delay, which measures the average time it takes for a data unit, e.g., packet, to reach its destination. Backpressure, by itself, is a data network routing scheme that relies on data queue lengths stored in each node participating in the network to make data transmissions decisions between devices.

The network can be represented by a multi-commodity flow system in which every node can be a potential destination (corresponding to a particular commodity). The network can include N nodes, with each node maintaining N−1 queues, one for each commodity, with the $j^{th}$ queue at each node containing packets that are destined for node j. Let $Q_i^c(t)$ indicate the number of packets destined to node c queued at node i at time t. Since, $Q_i^i(t)=0$ $\forall t$, (i.e., a node is not required to maintain a queue for packets that are destined for itself), the node has N−1 queues rather than N queues.

Let $\mu_{ij}^c(t)$ be the scheduling and routing variable that indicates the number of packets of commodity c to be scheduled on link (i,j). Some backpressure scheduling and routing implementations can select the $\mu_{ij}^c(t)$ that solve the following problem (a form of maximum weight independent set selection):

$$\max \sum_{i,j,c} \Delta_{ij}^c(t) \cdot \mu_{ij}^c(t)$$

subject to:

$$\sum_c \mu_{ij}^c(t) \le \theta_{ij}(t), \forall i, \forall j \quad (1)$$

$$\mu_{ij}^c(t) \cdot \mu_{km}^d(t) = 0, ((i, j), (k, m)) \in \Omega(t), \forall c, \forall d$$

$$\mu_{ij}^c(t) \ge 0, \forall i, \forall j, \forall c$$

where $\Delta_{ij}^c(t)=Q_i^c(t)-Q_j^c(t)$ is the link weight, which denotes the queue differential for commodity c on link (i, j) at slot t; $\theta_{ij}(t)$ is the channel state in terms of number of packets that can be transmitted over link (i, j) during slot t; and $\Omega(t)$ is the link interference set at slot t such that if link (i, j) interferes with link (i', j') at slot t then ((i, j), (i', j'))∈$\Omega(t)$ and hence, those two links can not be both scheduled at slot t. The maximization problem in (1) can be solved by finding the maximum commodity $c^*_{ij}(t)$ for each link (i, j) at slot t that maximizes $\Delta_{ij}^c(t)$ and assign $\mu_{ij}^c(t)=0$ for all $c \ne c^*_{ij}(t)$ and then solve:

$$\max \sum_{i,j} \Delta_{ij}^{c^*_{ij}(t)}(t) \cdot \mu_{ij}^{c^*_{ij}(t)}(t)$$

subject to:

$$\mu_{ij}^{c^*ij(t)}(t) \le \theta_{ij}(t), \forall i, \forall j$$

$$\mu_{ij}^{c^*ij(t)}(t) \cdot \mu_{km}^{c^*km(t)}(t)=0, ((i,j),(k,m)) \in \Omega(t)$$

$$\mu_{ij}^{c^*ij(t)}(t) \ge 0, \forall i, \forall j \quad (2)$$

FIG. 1 shows a diagram of a node architecture that is based on BWAR. A BWAR-enabled node 105 includes a group of transmitter queues 110a-n, and a group duplicate buffers 115a-n. In some implementations, there are a set of N−1 duplicate buffers of size $D_m$ at each BWAR-enabled node. As depicted, the transmitter queues 110a-n are associated with respective duplicate buffers 115a-n. In this example, node 105 is the Nth node. Thus, transmitter queue 110a and duplicate buffer 115a are used to route packets to node 1; transmitter queue 110b and duplicate buffer 115b are used to route packets to node 2; transmitter queue 110c and duplicate buffer 115c are used to route packets to node 3; and transmitter queue 110n and duplicate buffer 115n are used to route packets to node N−1. Note that queues are not required for the Nth node, since node 105 is the Nth node. In some implementations, the node 105 can be a part of a network such as an ICMN, where nodes need to communicate with other nodes in the ICMN, however ICMN nodes may have a short radio range, and thus a ICMN node may not have the radio range to reach every node within the network, and as a result, packets have to be forwarded between one or more intermediate nodes.

Besides the original queue occupancy $Q_i^c(t)$ which has the same meaning as in traditional backpressure for the transmitter queues 110a-n, the duplicate buffer occupancy for the duplicate buffers 115a-n is denoted by $D_i^c(t)$ that indicates the number of duplicate packets at node i that are destined to node c at time t. Again, $Q_i^i(t)=D_i^i(t)=0$ $\forall t$ since destinations need not buffer any packets intended for themselves. The duplicate buffers 115a-n can be maintained and utilized as follows:

1) Original packets when transmitted are removed from the main queue; however, if the queue size is lower than a certain threshold $q_{th}$, then the transmitted packet is duplicated and kept in the duplicate buffer associated with its destination if it is not full (otherwise no duplicate is created). Setting both $q_{th}$ and $D_{max}$ to the value of the maximum link service rate can be enough and can decrease delay.

2) Duplicate packets are not removed from the duplicate buffer when transmitted. They are only removed when they are notified to be received by the destination, or a predefined timeout has occurred.

3) When a certain link is scheduled for transmission, the original packets in the main queue are transmitted first. If no more original packets are left, only then duplicates are transmitted. Thus the duplicate buffer has a strictly lower priority.

4) Copies of a delivered packet in the network can be deleted in response to the first copy being successfully delivered to the intended destination.

A BWAR implementation can require the solution of a maximum weight independent set problem:

$$\max \sum_{i,j,c} \Delta_{BWAR,ij}^c(t) \cdot \mu_{ij}^c(t)$$

subject to:

$$\sum_c \mu_{ij}^c(t) \le \theta_{ij}(t), \forall i, \forall j \quad (3)$$

$$\mu_{ij}^c(t) \cdot \mu_{km}^d(t) = 0, ((i, j), (k, m)) \in \Omega(t), \forall c, \forall d$$

$$\mu_{ij}^c(t) \ge 0, \forall i, \forall j, \forall c$$

An enhanced link weight for BWAR, $\Delta_{BWAR,ij}^c(t)$, can be defined as follows, to take into account the occupancy of the duplicate buffer:

$$\Delta_{BWAR,ij}^c(t) = \quad (4)$$

$$(Q_i^c(t) - Q_j^c(t)) + \frac{1}{2}\left(1_{j=c \text{ And } Q_i^c(t)+D_i^c(t)>0}\right) + \frac{1}{4}\frac{1}{D_{max}}(D_i^c(t) - D_j^c(t))$$

Here the indicator function $1_{j=c \text{ And } Q_i^c(t)+D_i^c(t)>0}$ denotes that node j is the final destination for the considered commodity c. This gives higher weight to commodities that encounter their destinations. The maximization problem in (3) can be solved first by finding the maximum commodity $c^*_{BWAR,ij}(t)$ for each link (i, j) at slot t that maximizes $\Delta_{BWAR,ij}^c(t)$ as previously discussed. It is important to notice that any solution to (3) is also a solution to (1) (but not necessarily vice versa) assuming that $Q_i^c(t)$ and $\mu_{ij}^c(t)$ are integers. The small weight added in (4) gives advantage first to links/commodities which encounter the destination and then to higher duplicate buffer deferential to increase the chance of serving duplicates. The small fractions in (4) assures this priority when there are ties in (1) to boost delay performance.

A BWAR-enabled node can create duplicate packets whenever a transmitter's queue occupancy is low. In some implementations, duplicate packets can be removed via a timeout mechanism. A BWAR-enabled node can implement a timeout mechanism by time-stamping packets. For example, whenever a packet arrives into the network, it can be time-stamped. After a timeout period P from that arrival time, any duplicate copies of that packet at any node in the network can be deleted.

A BWAR-enabled node can communite within a timeslotted network having N nodes that communicate with each other. Packets arrive to each node, and each packet must be delivered to a specific destination, possibly via a multi-hop path. Each node maintains multiple queues, one per destination, to store packets. Each queue has the following dynamics:

$$Q(t+1) = \max[Q(t) - \mu(t), 0] + A(t) \quad (5)$$

where Q(t) is the queue size at time t, $\mu(t)$ is the transmission rate out of the queue at time t, and A(t) is the total packet arrivals to the queue at time t.

In each time slot, a BWAR-enabled node can observe queue states and channel states and make scheduling and routing decisions based on this information. Let $Q_n^c(t)$ be the queue backlog (number of packets) in node $n \in \{1, 2, \ldots, N\}$ that are destined for node $c \in \{1, \ldots, N\} \setminus \{n\}$ at slot t. Let $A_n^c(t)$ be the exogenous packet arrivals that come to node n and destined to node c at time t with rate $\lambda_n^c$. Exogenous arrivals are the packets that just entered the network. Endogenous arrivals, however, are arrivals from other nodes and were already inside the network. Packets may be forwarded to several nodes before reaching the destination. Let us define the capacity region $\Lambda$ to be the set of all possible arrival rate vectors $(\lambda_n^c)_{n,c}$ that can be stably supported by some scheduling and routing strategy. Let $\theta_{ab}(t)$ be the channel state from node a to node b at time t in terms of how many packets can be transmitted. Let $\mu_{ab}(t)$ be the scheduled service rate from node a to node b at slot t. Let $\mu_{ab}^c(t)$ be the service rate for commodity c routed from node a to node b at time t, which must satisfy:

$$\sum_c \mu_{ab}^c(t) \le \mu_{ab}(t) \le \theta_{ab}(t) \quad (6)$$

The queue dynamics for each time slot and for each queue is the following:

$$Q_n^c(t+1) = \max\left[Q_n^c(t) - \sum_b \mu_{nb}^c(t), 0\right] + A_n^c(t) + \sum_a \tilde{\mu}_{an}^c(t) \quad (7)$$

where $\tilde{\mu}$ is the actual transfer rate due to insufficient packets in the queue. For example, on some slots we may be able to send 5 packets, but we only send 3, because only 3 were available in the queue. In equation (7), $A_n^c(t)$ are the exogenous arrivals and $\Sigma_a \tilde{\mu}_{an}^c(t)$ are the endogenous arrivals to node n.

Define the vector $Q(t) = (Q_n^c(t))_{n,c}$ to be the vector of all queues in the network at time t. The Lyapunov function L(Q(t)) can be defined as follows:

$$L(Q(t)) = \sum_{n,c} Q_n^c(t)^2 \quad (8)$$

The Lyapunov drift $\Delta(Q(t))$ is defined as follows:

$$\Delta(Q(t)) = E\{L(Q(t+1)) - L(Q(t)) | Q(t)\} \quad (9)$$

It is known that:

$$\Delta(Q(t)) \le \sum_{n,c} E\{\beta_n^c(t)\} - 2\sum_{n,c} Q_n^c(t) E\{\psi_n^c(t) | Q(t)\} \quad (10)$$

Such that:

$$\beta_n^c(t) = \left(\sum_b \mu_{nb}^c(t)\right)^2 + \left(A_n^c(t) + \sum_a \mu_{an}^c(t)\right)^2 \quad (11)$$

and, $$\psi_n^c(t) = \sum_b \mu_{nb}^c(t) - \sum_a \mu_{an}^c(t) - A_n^c(t) \quad (12)$$

Maximizing $\Sigma_{n,c} Q_n^c(t) E\{\psi_n^c(t) | Q(t)\}$ in (10) which is equivalent to the maximization problem defined in (1) yields the backpressure algorithm for scheduling and routing and supports the maximum capacity $\Lambda$. The average queue occupancy bound for backpressure scheduling and routing is:

$$\overline{Q} \le \frac{\overline{\beta}}{2\varepsilon} \quad (13)$$

such that, $$\overline{Q} = \lim_{T \to \infty} \frac{1}{T} \sum_{\tau=0}^{T} \sum_{n,c} E\{Q_n^c(\tau)\} \quad (14)$$

$$\overline{\beta} = \lim_{T \to \infty} \frac{1}{T} \sum_{\tau=0}^{T} \sum_{n,c} E\{\beta_n^c(\tau)\} \quad (15)$$

$$\varepsilon = \mathrm{argmax}_{x \ge 0} (\lambda_n^c + x)_{n,c} \in \Lambda \quad (16)$$

where, $\overline{Q}$ is the average of total queue backlog occupancy; $\overline{\beta}$ is the sum of the second moment of the scheduled transmission rate out of each queue plus the second moment of the sum of the arrivals and scheduled transmission rate into each queue and summed over all queues; and $\varepsilon$ is the maximum positive number such that adding $\epsilon$ to each arrival rate still makes them inside the capacity region $\Lambda$.

As before, let $Q_n^c(t)$ be a queue backlog in node n of commodity c at time slot t. We define $D_n^c(t)$ to be number of redundant packets in node n of commodity c at time t. Redundant packets are stored separately in redundant buffers. Redundant packets have lower priority in such a way that no redundant packet is served unless the queue of original packets is empty. For all timeslots t, $A_n^c(t)$, $\theta_{ab}(t)$, $\mu_{ab}(t)$, $\mu_{ab}^c(t)$ and $\tilde{\mu}_{ab}^c(t)$ are defined exactly as before. Arrival rates $\lambda_n^c$ are also defined as before. The queue dynamics in equation (7) is updated in BWAR to be:

$$Q_n^c(t+1) = \max\left[Q_n^c(t) - \gamma_n^c(t) - \sum_b \mu_{nb}^c(t), 0\right] + A_n^c(t) + \sum_a \tilde{\mu}_{an}^c(t) \quad (17)$$

where $\gamma_n^c(t)$ is the number of original packets inside node n of commodity c at time slot t that are known to be delivered by some duplicates to the destination using a BWAR strategy described herein. One ideal model is that the network is able to find out which packets are delivered immediately, or after some delay. Our analysis allows for any such knowledge of delivered packets. We show later a practical timeout-based strategy for duplicate removals. Those $\gamma_n^c(t)$ packets are needed to be removed from the queue since they are already known to be delivered. It can be assumed that deletions occur during the time slot t, rather than at the beginning of said time slot. The queue dynamics in (17) consider only original packets and does not take into account the duplicate packets. We define the redundant buffer dynamics that are isolated from the original queue dynamics as follows:

$$D_n^c(t+1) = D_n^c(t) - \tilde{\gamma}_n^c(t) + \delta_n^c(t) + \sum_a \omega_{an}^c(t) \quad (18)$$

where $\tilde{\gamma}_n^c(t)$ denotes the number of duplicates in node n of commodity c at time t that are known to be already delivered to the destination and hence they must be removed; $\delta_n^c(t)$ is number of duplicates created at node n during slot t according to the adaptive redundancy criteria; and $\omega_{ab}^c(t)$ is the actual duplicate transmissions from node a to node b of commodity c at time t. No duplicates are created in, nor transmitted to, full duplicate buffers. Therefore, $D_n^c(t+1) \leq D_{max} \; \forall t$ As before, $Q(t) = (Q_n^c(t))_{n,c}$ is the vector of all queue backlogs at time t. Let $U_n^c(t)$ be the undelivered queue backlog in node n of commodity c at time t. Hence, $$U_n^c(t) = Q_n^c(t) - \gamma_n^c(t) \quad (19)$$

Let $U(t) = (U_n^c(t))_{n,c}$ be the vector of all queue backlogs of undelivered packets at time t. Let $\Gamma(t) = (U_n^c(t))_{n,c}$ be the vector of all removed duplicates at time t. Define the Lyapunov function $L(X) = \Sigma(X_i)^2$. Assume that $\overline{Q}$, $\overline{\beta}$ and $\epsilon$ are defined as before in (14), (15) and (16) respectively. Also define, $$\overline{U} = \lim_{T \to \infty} \frac{1}{T} \sum_{\tau=0}^{T} \sum_{n,c} E\{U_n^c(\tau)\} \quad (20)$$

$$\overline{\Gamma^2} = \lim_{T \to \infty} \frac{1}{T} \sum_{\tau=0}^{T} \sum_{n,c} E\{(\gamma_n^c(\tau))^2\} \quad (21)$$

$$\overline{Q \cdot \Gamma} = \lim_{T \to \infty} \frac{1}{T} \sum_{\tau=0}^{T} \sum_{n,c} E\{Q_n^c(\tau) \cdot \gamma_n^c(\tau)\} \quad (22)$$

$$\overline{U \cdot \Gamma} = \lim_{T \to \infty} \frac{1}{T} \sum_{\tau=0}^{T} \sum_{n,c} E\{U_n^c(\tau) \cdot \gamma_n^c(\tau)\} \quad (23)$$

where $\overline{U}$ is the average of total queue backlog occupancy for undelivered packets in the main queues; $\overline{\Gamma^2}$ is the second moment of number of removed original packets that has been already delivered by duplicates summed over all original queues; $\overline{Q \cdot \Gamma}$ is the joint second moment of number of removed packets and the queue backlog summed over all queues; and $\overline{U \cdot \Gamma}$ is the joint second moment of number of removed packets and the queue backlog of undelivered packets summed over all queues. Note that arrival rates $A_n^c(t)$ and the channel states $\theta_{ab}(t)$ can be i.i.d. over timeslots. This can be extended to general ergodic (possibly non-i.i.d.) processes using, for example, a T-slot drift argument.

Theorem 1 If the channel states $\theta_{ab}(t)$ are i.i.d. and the arrival processes $A_n^c(t)$ are i.i.d. with rates $\lambda_n^c$ that are inside the capacity region $\Lambda$ such that $(\lambda_n^c + \epsilon)_{n,c} \in \Lambda$ for some $\epsilon > 0$, then BWAR stabilizes all queues with the following bound on the average of total queue occupancy of undelivered packets $\overline{U}$, $$\overline{U} \leq \frac{\overline{\beta} - \overline{\Gamma^2} - 2\overline{U \cdot \Gamma}}{2\varepsilon} \quad (24)$$

Proof: Squaring both sides of (17), $$Q_n^c(t+1)^2 \leq (Q_n^c(t) - \gamma_n^c(t))^2 + \beta_n^c(t) - 2(Q_n^c(t) - \gamma_n^c(t))\psi_n^c(t) \quad (25)$$

where $\beta_n^c(t)$ and $\psi_n^c(t)$ are defined as before in (11) and (12) respectively Summing over all n and c, $$\sum_{n,c} Q_n^c(t+1)^2 \leq \quad (26)$$

$$\sum_{n,c} (Q_n^c(t) - \gamma_n^c(t))^2 + \sum_{n,c} \beta_n^c(t) - 2\sum_{n,c} (Q_n^c(t) - \gamma_n^c(t))\psi_n^c(t)$$

Taking the conditional expectation $E\{.|Q(t) - \Gamma(t)\}$, $$E\{L(Q(t+1)) - L(Q(t) - \Gamma(t)) | Q(t) - \Gamma(t)\} \leq \quad (27)$$

$$E\left\{\sum_{n,c} \beta_n^c(t) - 2\sum_{n,c} (Q_n^c(t) - \gamma_n^c(t))\psi_n^c(t) \middle| Q(t) - \Gamma(t)\right\}$$

A BWAR policy can maximize (3) and hence (1) taking into account the undelivered packets U(t) only, it can also maximize:

$$E\left\{\sum_{n,c} (Q_n^c(t) - \gamma_n^c(t))\psi_n^c(t) \middle| Q(t) - \Gamma(t)\right\} \quad (28)$$

However, because $(\lambda_n^c+\epsilon)_{n,c}$ are inside the capacity region $\Lambda$, there exists a stationary and randomized algorithm alg*, which makes decisions independent of $Q(t)-\Gamma(t)$, yielding $\psi^{*c}_n(t)$ that satisfy:

$$E\{\psi^{*c}_n(t)\} \geq \epsilon \forall n,c$$

Because BWAR maximizes (28), it follows that:

$$E\left\{\sum_{n,c}(Q_n^c(t)-\gamma_n^c(t))\psi_n^c(t)\bigg|Q(t)-\Gamma(t)\right\} \geq \qquad (29)$$

$$E\left\{\sum_{n,c}(Q_n^c(t)-\gamma_n^c(t))\psi_n^{*c}(t)\bigg|Q(t)-\Gamma(t)\right\} \geq \sum_{n,c}(Q_n^c(t)-\gamma_n^c(t))\epsilon$$

Using this in (27) yields, $$E\{L(Q(t+1))-L(Q(t)-\Gamma(t))|Q(t)-\Gamma(t)\} \leq \qquad (30)$$

$$\sum_{n,c}E\{\beta_n^c(t)|Q(t)\Gamma(t)\} - 2\epsilon\sum_{n,c}(Q_n^c(t)-\gamma_n^c(t))$$

Taking iterative expectation, $$E\{L(Q(t+1))\}-E\{L(Q(t)-\Gamma(t))\} \leq \qquad (31)$$

$$\sum_{n,c}E\{\beta_n^c(t)\} - 2\epsilon\sum_{n,c}E\{(Q_n^c(t)-\gamma_n^c(t))\}$$

Notice that:

$$E\{L(Q(t)-\Gamma(t))\}=E\{L(Q(t))\}+E\{L(\Gamma(t))\}-2E\{Q(t)\cdot\Gamma(t)\} \qquad (32)$$

Hence by summing over timeslots $\tau\in\{0, \ldots, T\}$ and by telescoping, $$E\{L(Q(T))\}-E\{L(Q(0))\} - \sum_{\tau=0}^{T}E\{L(\Gamma(\tau))\} + 2\sum_{\tau=0}^{T}E\{Q(\tau)\cdot\Gamma(\tau)\} \leq \qquad (33)$$

$$\sum_{\tau=0}^{T}\sum_{n,c}E\{\beta_n^c(\tau)\} - 2\epsilon\sum_{\tau=0}^{T}\sum_{n,c}E\{(Q_n^c(\tau)-\gamma_n^c(\tau))\}$$

Dividing by T and taking the lim for $T\to\infty$ implies:

$$\overline{Q}-\Gamma \leq \frac{\overline{\beta}+\overline{\Gamma^2}-2\overline{Q\cdot\Gamma}}{2\epsilon} \qquad (34)$$

Now for undelivered packets $\overline{U}$, we have by (19) and (34), $$\overline{U} \leq \frac{\overline{\beta}-\overline{\Gamma^2}-2\overline{Q\cdot\Gamma}}{2\epsilon}$$

Remark: Note that the computation of $\overline{\Gamma^2}$ and $\overline{U\cdot\Gamma}$ is determined by the duplicate removal strategies. Depending on these terms, the queue bound in this above theorem could be much lower than the queue occupancy bound for regular backpressure in (13). Thus, BWAR can be no worse in terms of throughput than backpressure, and potentially much better in terms of delay, since by Little's theorem average delay is proportional to the average number of undelivered packets.

BWAR can be simulated in the context of encounter-based scheduling and routing for a simple model (cell-partitioned network), which yields useful insights on its performance. In this model, the control variables can be simplified to the whole transmission rates $\mu_{ab}(t)$ for scheduling and the commodity transmission rates $\mu_{ab}^c(t)$ for routing. Further, the network deployment area can be separated into disjoint cells and nodes have i.i.d. mobility model as follows. We have N nodes and C cells. At each slot t, node n can be inside any cell with equal probabilities of $C^{-1}$. For collision and interference simplicity, only one transmission (one packet) is allowed in each cell in each time slot. Because of this we set $q_{th}=D_{max}=1$. Another simplifying assumption is that the nodes in the network are organized into pairs, acting as destinations to each other. Each node has Bernoulli exogenous arrivals intended for its pair. Depending on the number of cells C in the network we can choose the right number of the nodes $N \approx 1.79 \cdot C$ in order to maximize throughput. Our simulation results show that by optimizing number of nodes based on the number of cells to maximize throughput, the delay also is improved. We consider in our simulations, networks of sizes 9, 12, 16, 20, and 25 cells in the network. And for optimality, number of nodes are chosen to be 16, 20, 28, 34, and 44 respectively. For timeout duplicate removals we set the timeout value P=C.

Here we show how BWAR works in the cell-partitioned network with the simplifying assumption that only one transmission is allowed per cell per time slot. Each time slot t and for each cell l we choose two nodes a* and b* and commodity c* such that: (1) a* and b* are in cell l; (2) $Q_{a*}^{c*}(t)-Q_{b*}^{c*}(t) \geq Q_a^c(t)-Q_b^c(t)$ for all c, for all a and b in cell l at time slot t (captures the maximization of queue differentials of the main queues); (3) If there exists a, b in cell l such that, $Q_a^b(t)-Q_b^b(t)=Q_{a*}^{c*}(t)-_{b*}^{c*}(t)$ then c*=b* (captures the destination advantage); and (4) if there exists a, b in cell l and c such that $Q_a^c(t)-Q_b^c(t)=Q_{a*}^{c*}(t)-Q_{b*}^{c*}(t)$ and $\{c^* \neq b^*$ or $[(c=b)$ and $(c^*=b^*)]\}$, then:

$$(Q_a^c(t)+D_a^c(t))-(Q_b^c(t)+D_b^c(t)) \leq (Q_{a*}^{c*}(t)+D_{a*}^{c*}(t)) - (Q_{b*}^{c*}(t)+(t)+D_{b*}^{c*}(t))$$

(captures the maximization of duplicate buffer differentials if there are some ties in main queue differentials). The algorithm simply assigns $\mu_{a*b*}^{c*}(t)$ a value of 1, and assigns all other $\mu_{ab}^c(t)$ a value of 0 such that a, b in cell l. When a transmission is made from node a to node b of commodity c at time slot t and that transmission will make $Q_a^c(t+1)+D_a^c(t+1)=0$, then this transmitted packet is duplicated and stored in the duplicate buffer of node a making $D_n^c(t)=1$ instead of 0. Duplicate packets are served only if there are no original packets to transmit. There is strict lower priority of duplicate packets compared to original packets.

Various examples of routing protocols based on BWAR technology presented herewith include: BWAR with Ideal packet removal and original packets retained in the Main queue (BWAR-IM), BWAR with Ideal packet removal and original packets moved to Duplicate buffer upon copy (BWAR-ID), and BWAR with Time-out based packet removal and original packets moved to Duplicate buffer upon copy (BWAR-TD). Other variations of BWAR are possible.

BWAR-IM is based on a BWAR technology presented herein in which the destination advantage also holds. Here, when an original packet is duplicated the original packet remains in the main queue while the duplicate is stored in the duplicate buffer. We assume here whenever a packet reaches the destination, all of its duplicates are deleted including the original one in the main queue instantaneously.

BWAR-ID is similar to BWAR-IM, where the difference is that whenever an original packet is duplicated, both the original packet and the duplicate are stored in duplicate buffers (of course in two different nodes, one in the receiver and the other in the sender respectively). In BWAR-ID, a node can detect when a received packet is a duplicate, and based on the received packet being a duplicate, the node can store the packet in a duplicate buffer for the packet's destination rather than the transmitter queue for the packet's destination.

BWAR-TD is an implementation of BWAR in which duplicates are deleted from the duplicate buffer after a predefined timeout value P has passed since the first time the original packet is admitted to the network. However, the original packet that is kept in duplicate buffer is flagged and will not be deleted when a timeout occurred. It is only deleted if it is acknowledged directly by the destination if its already received or otherwise is moved back to the main queue when it encounters the destination.

In some BWAR-TD implementations, if time-out P has already passed for one packet m, all duplicates of m that are stored in duplicate buffers are removed except for the flagged copy m* which correspond to the original copy of m. When m* encounters the destination at time t after the time-out P, it either receives an acknowledgement that packet m is already received, and hence, m* will be removed, or it receives a negative acknowledgment that m is not received yet, hence, m* will be moved to original queue at time t+1. This approach guarantees that no packet will be lost in the case of any two nodes in the network encountering each other infinitely often.

Other variations of BWAR are possible. For example, BWAR with Ideal packet removal and original packets moved to Duplicate buffer upon copy with Energy enhancement (BWAR-ID-E) is possible. BWAR with Time-out based packet removal and original packets moved to Duplicate buffer upon copy with Energy enhancement (BWAR-TD-E) is also possible. BWAR-ID-E is similar to BWAR-ID except that the number of copies for each packet is bounded to be less than or equal constant L. Similarly, BWAR-TD-E is similar to BWAR-TD except that the number of copies for each packet is bounded to be less than or equal constant L.

For variations such as BWAR-ID-E and BWAR-TD-E, the number of copies for each packet by constant L can be limited. Each packet in the network can include a field called copycount in its header to specify number of copies allowed for this packet. When a packet is admitted to the network the value of its copycount is set to L. In BWAR-ID-E and BWAR-TD-E, only packets with copycount>1 are allowed to be duplicated. When a duplicate m' for packet m (that has previous copycount value equals to $L_m$) is created, the copycount for m is set to $$\lceil \frac{L_m}{2} \rceil$$

and the copycount for m' is set to $$L_m - \lceil \frac{L_m}{2} \rceil.$$

This method can provide a fast way of distributing duplicates to different nodes (since copycount is splitted half and half when duplicate is created) and it can guarantee that the number of duplicates for any packet can not exceed L.

For comparision to BWAR, various examples of routing protocols include Regular Backpressure (RB), Regular Backpressure with Destination Advantage (RB-DA), and Spray and Wait (S&W) are used herewith. RB is the basic backpressure scheduling and routing mechanism, where decisions are made purely based on queue differentials. RB-DA is a slight modification in which packets corresponding to the destination are prioritized when the destination is encountered.

Figure 2A:
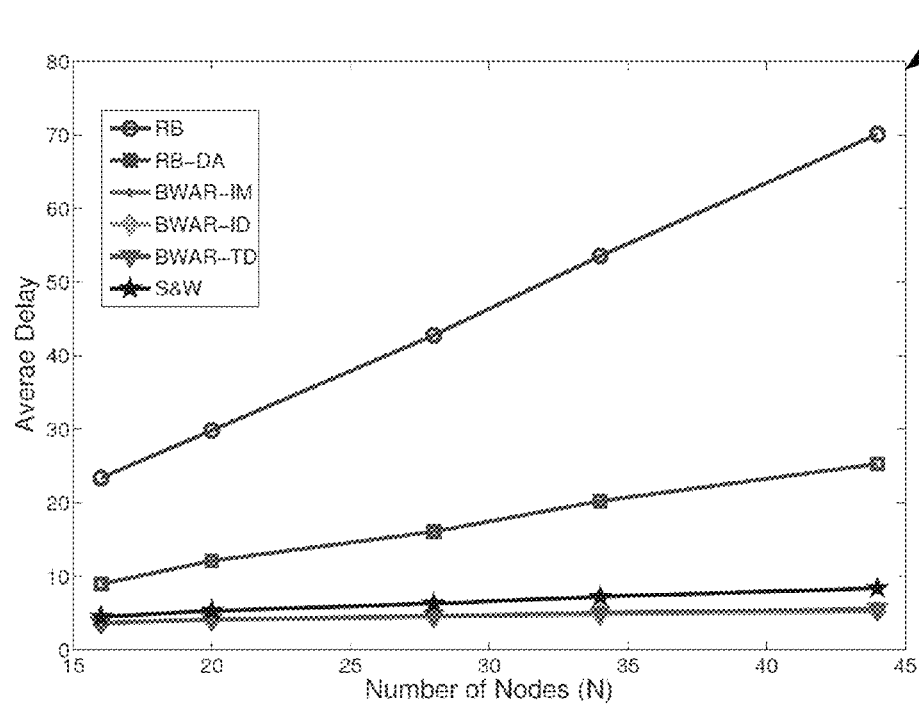
FIGS. 2A and 2B show graphs of performance metrics for various examples of routing protocols.
Figure 2B:
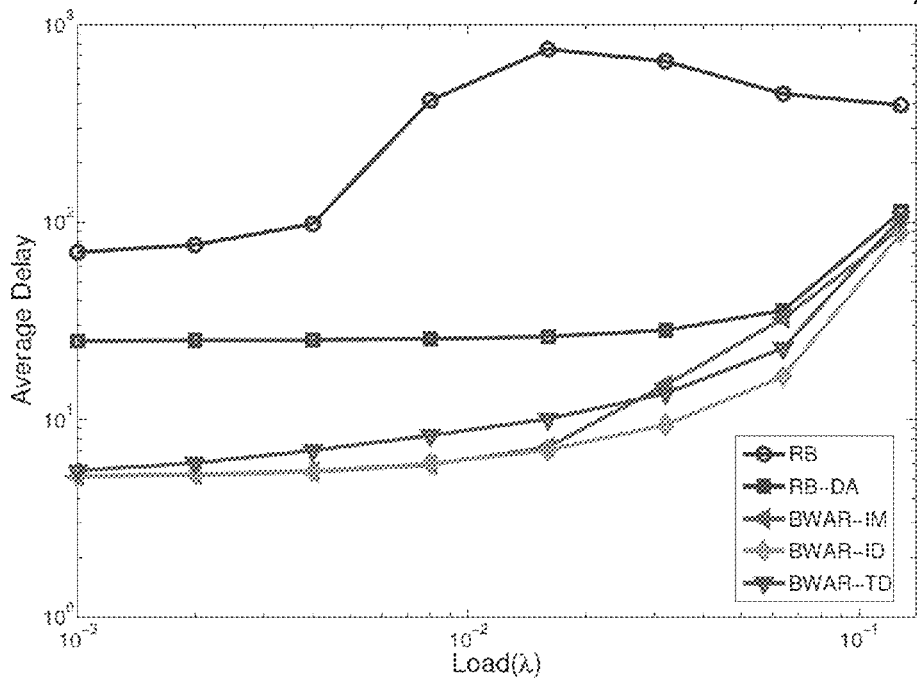

FIGS. 2A and 2B show graphs 201, 255 of performance metrics for various examples of routing protocols. Depicted procotols include RB, RB-DA, BWAR-IM, BWAR-ID, BWAR-TD, and S&W. S&W is shown for comparison with BWAR implementations. Our results show that BWAR implementations outperforms S&W. Each simulation runs for one million timeslots.

FIG. 2A shows a graph 201 of a performance metric for various examples of routing protocols. The graph 201 shows the average delay for a routing protocol versus the number of Nodes (N) for low load $\lambda$=0.001 out of the per node capacity region $\Lambda_{node}$=[0, 0.14]. Delay is reduced significantly when BWAR is used. For this low load scenario all BWAR variants have almost the same average delay and they perform slightly better than S&W.

FIG. 2B shows a graph 255 of a performance metric for various examples of routing protocols. The graph 255 shows the average delay for a routing protocol versus Load ($\lambda$). The graph 255 shows the great dramatic delay improvement of RB-DA compared to RB. As expected, as the load increases the delay improvement of BWAR declines compared to RB-DA. The graph 255 also shows how BWAR-ID performs much better compared to BWAR-IM beyond some threshold of load ($\lambda$). This shows how moving the duplicated original packet to the duplicate buffer can provide delay enhancement for high load scenarios.

Figure 3:
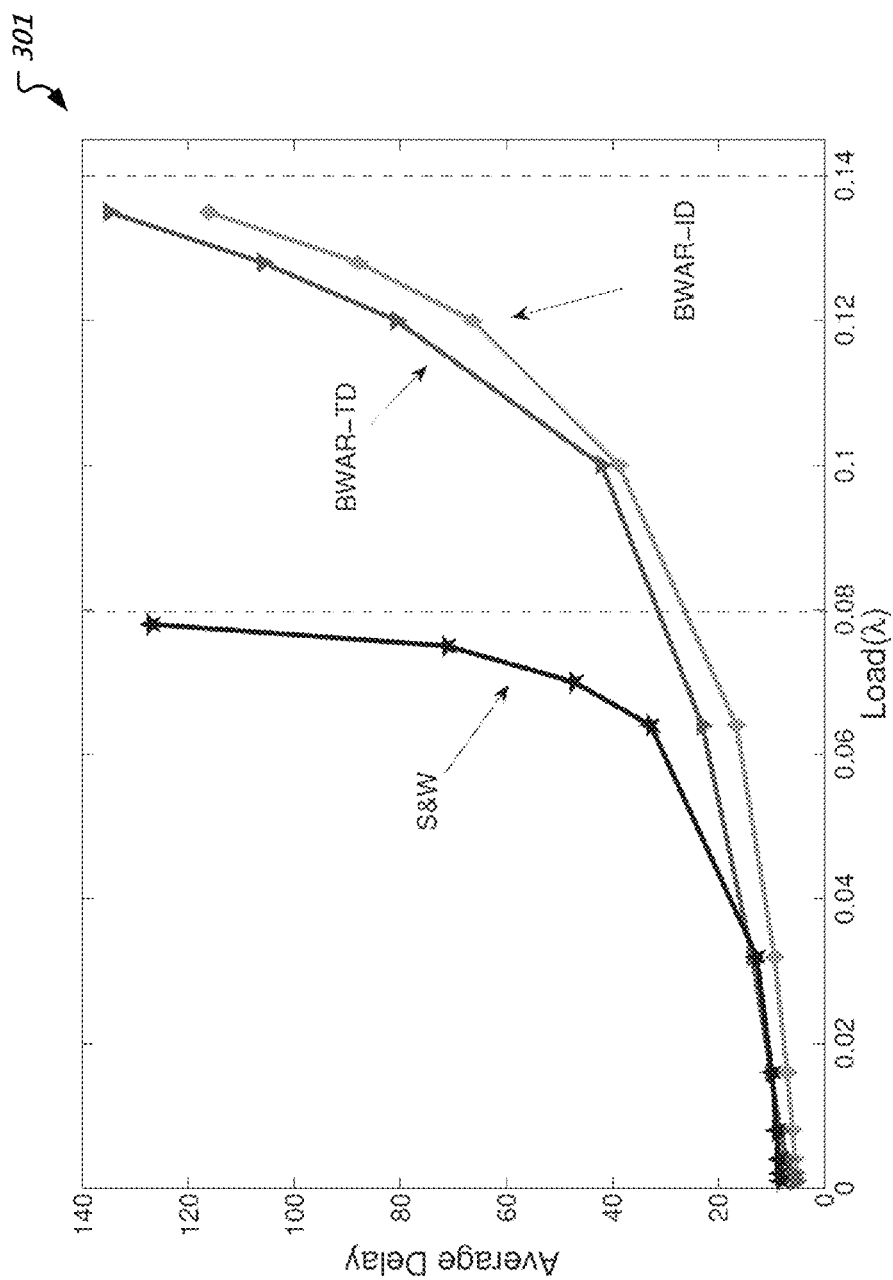
FIG. 3 shows a graph of a performance metric for various examples of routing protocols.

FIG. 3 shows a graph 301 of a performance metric for various examples of routing protocols. For this graph 301, the number of nodes N is set to 44. The graph 301 shows how a BWAR mechanism outperforms S&W delay performance for high load. The graph 301 also shows how BWAR supports almost twice the capacity region of S&W.

Figure 4:
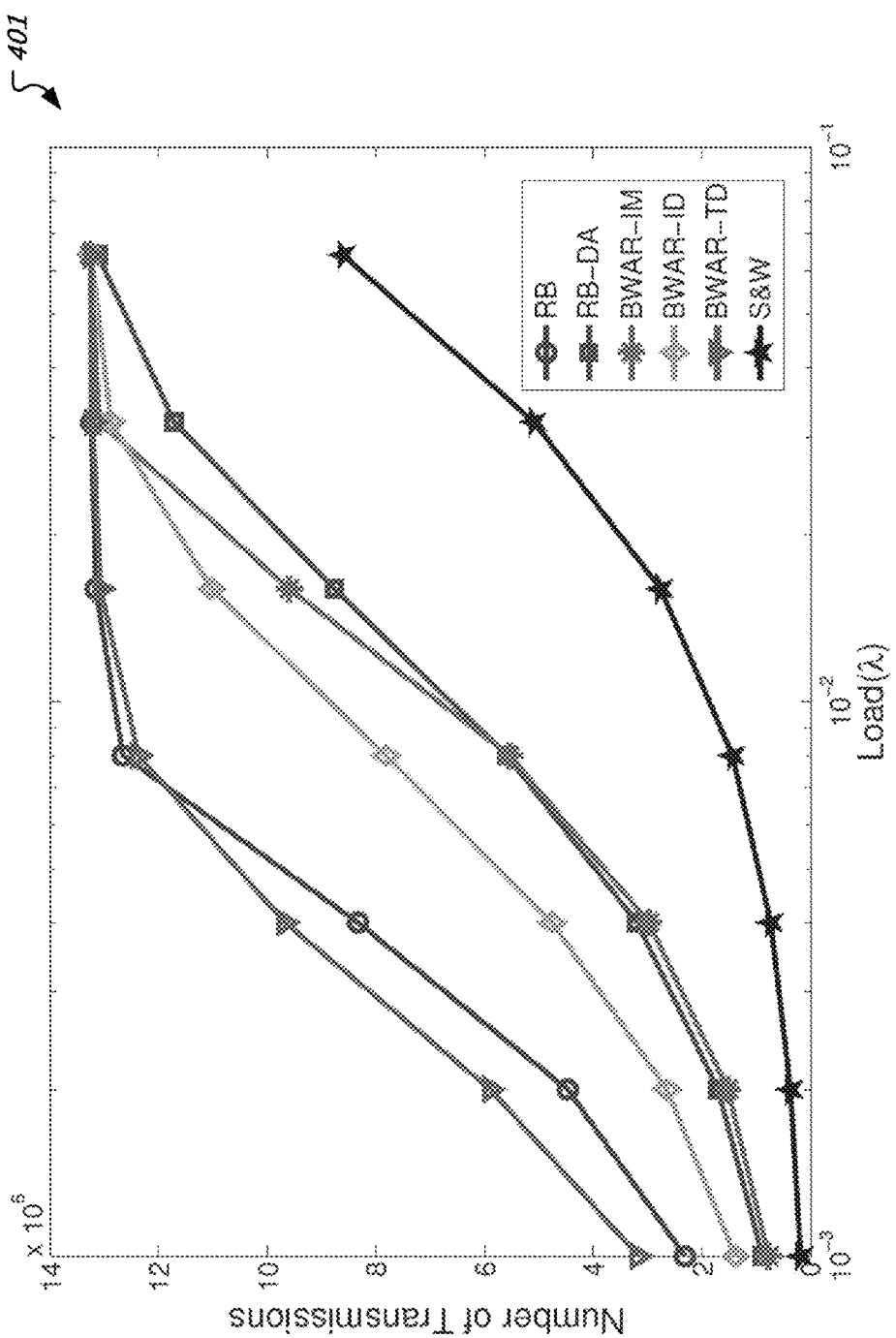
FIG. 4 shows another graph of a performance metric for various examples of routing protocols.

FIG. 4 shows another graph 401 of a performance metric for various examples of routing protocols. For this graph 401, the number of nodes N is set to 44. The graph 401 shows that BWAR-IM has a better total number of transmissions compared to RB for low load despite the flooding duplicates nature of BWAR at low load.

Figure 5:
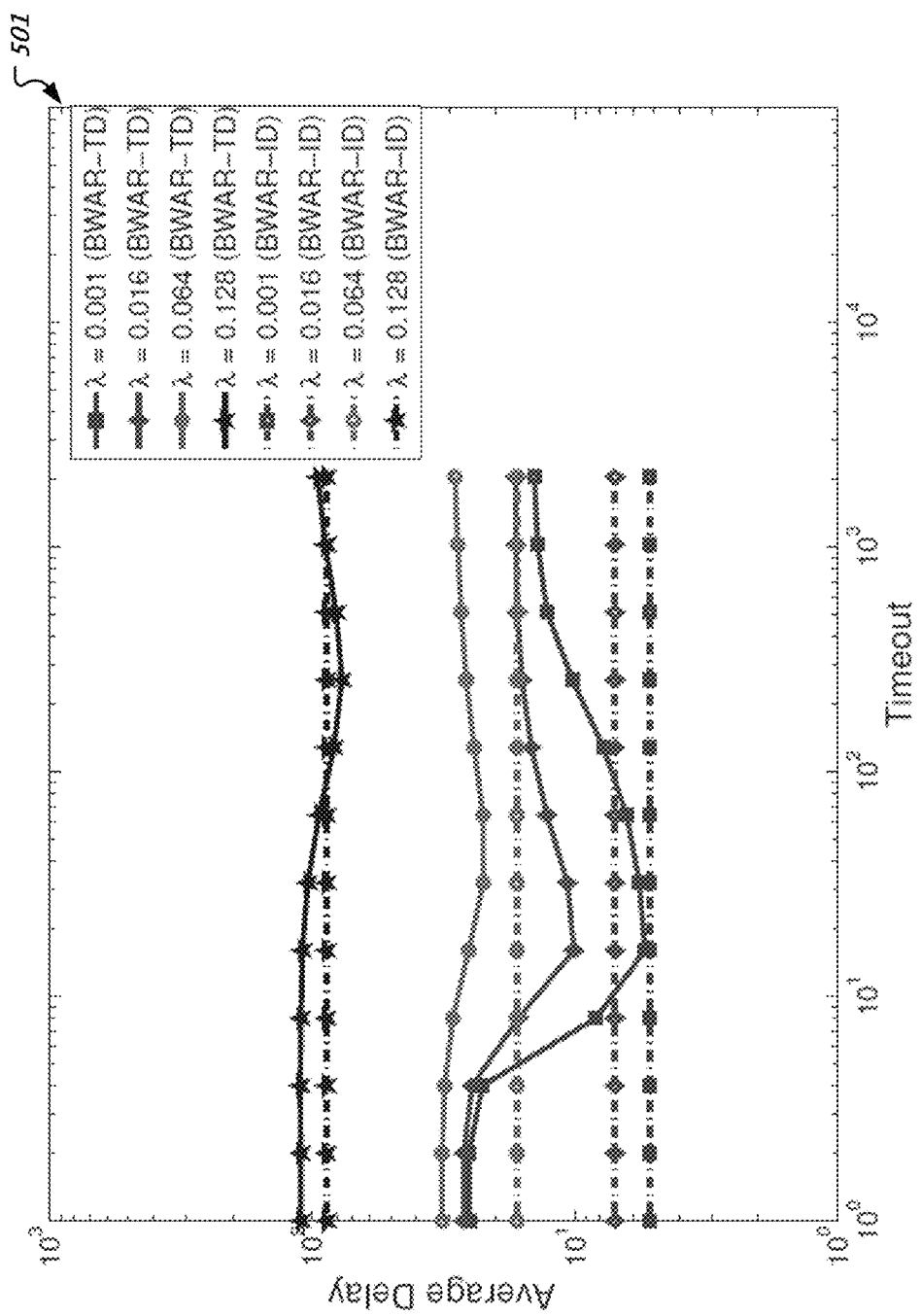
FIG. 5 shows a graph of the average delay versus timeout for different load scenarios.

FIG. 5 shows a graph 501 of the average delay versus timeout for different load scenarios. For this graph 501, the number of nodes N is set to 44. The graph 501 studies the effect of timeout value P of BWAR-TD for removing duplicates under different load scenarios (e.g., $\lambda \in \{0.001, 0.016, 0.064, 0.128\}$) and compares its delay performance with ideal duplicate removals in BWAR-ID.

Figure 6:
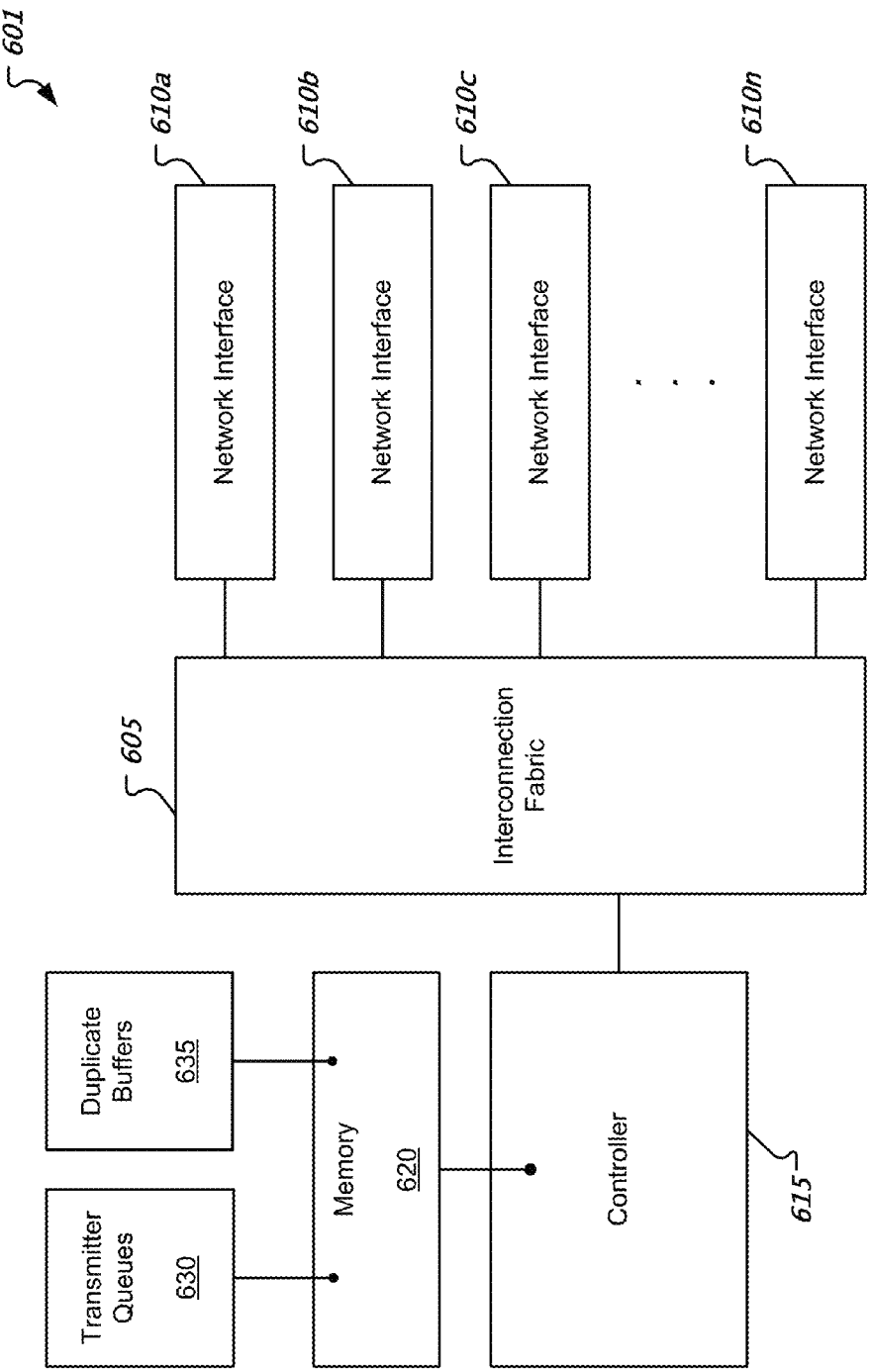
FIG. 6 shows a simplified diagram of an example of a node that is configured for BWAR.

FIG. 6 shows a simplified diagram of an example of a node 601 that is configured for BWAR. A node 601 includes an interconnection fabric 605 such as a broadcast-style bus or point-to-point switching fabric. The node 601 includes multiple network interfaces 610a-n that are communicatively coupled with the interconnection fabric 605. Network interfaces 610a-n include circuitry configured to communicate via a wireline network or a wireless network. The node 601 includes a controller 615 that is communicatively coupled with the interconnection fabric 605. The controller 615 is configured to use at least a portion of the memory 620 for one or more sets of queues to route data within the node 601. In this example, the memory 620 is configured by the controller 615 to store transmitter queues 630 and duplicate buffers 635. In some implementations, the transmitter queues 630 are stored within memories in respective network interfaces 610a-n. In some implementations, the duplicate buffers 635 are stored within memories in respective network interfaces 610a-n. In some implementations, the memory 620 is a collection of two or more discrete memory hardware components.

Figure 7:
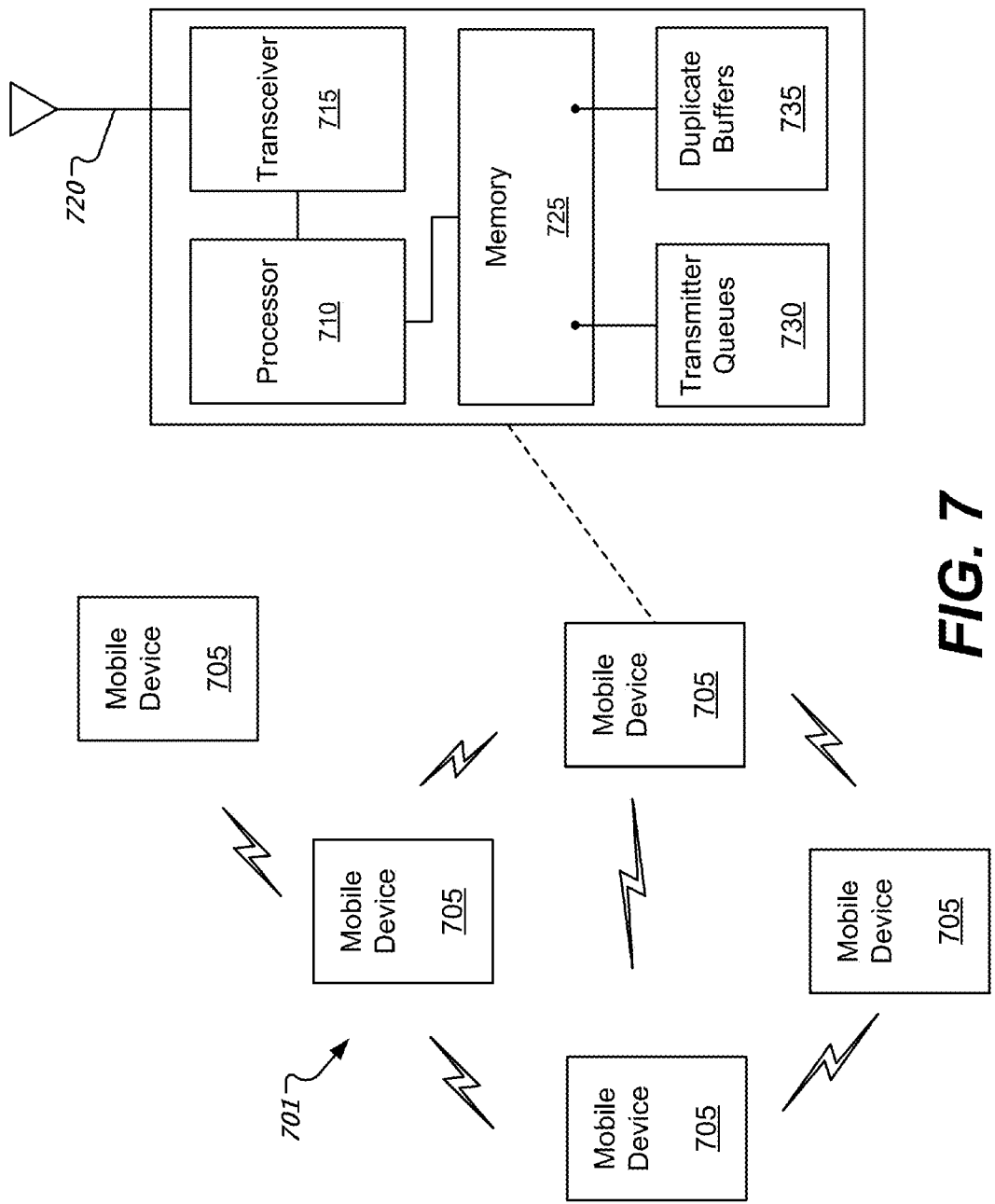
FIG. 7 shows a diagram of an example of mobile device network architecture that is configured for BWAR.

FIG. 7 shows a diagram of an example of mobile device network architecture that is configured for BWAR. A communication network 701 can include multiple nodes, e.g., mobile devices 705, that are configured to intercommunicate with each other. For example, the mobile devices 705 can form an ICMN. Each of the mobile devices 705 can include a processor 710, transceiver 715, and memory 725. The transceiver 715 can include receiver circuitry and transmitter circuitry. The transceiver 715 can be coupled with one or more antennas 720. The processor 710 includes hardware such as one or more processor cores.

The memory 725 can store transmitter queues 730 and duplicate buffers 735. In some implementations, the memory 725 can store a program. For example, a program, stored in memory 725, can be configured to cause the processor 710 to route packets through the network 701 based on backpressure scheduling using the transmitter queues 730, retain copies of at least a portion of the packets within the duplicate buffers 735 when a number of packets in the transmitter queues 730 satisfies a first threshold, and transmit the retained copies of the packets via the transceiver 715 to perform the routing once the number of packets in the transmitter queue 730 satisfies a second threshold, which is different than the first threshold.

Figure 8:
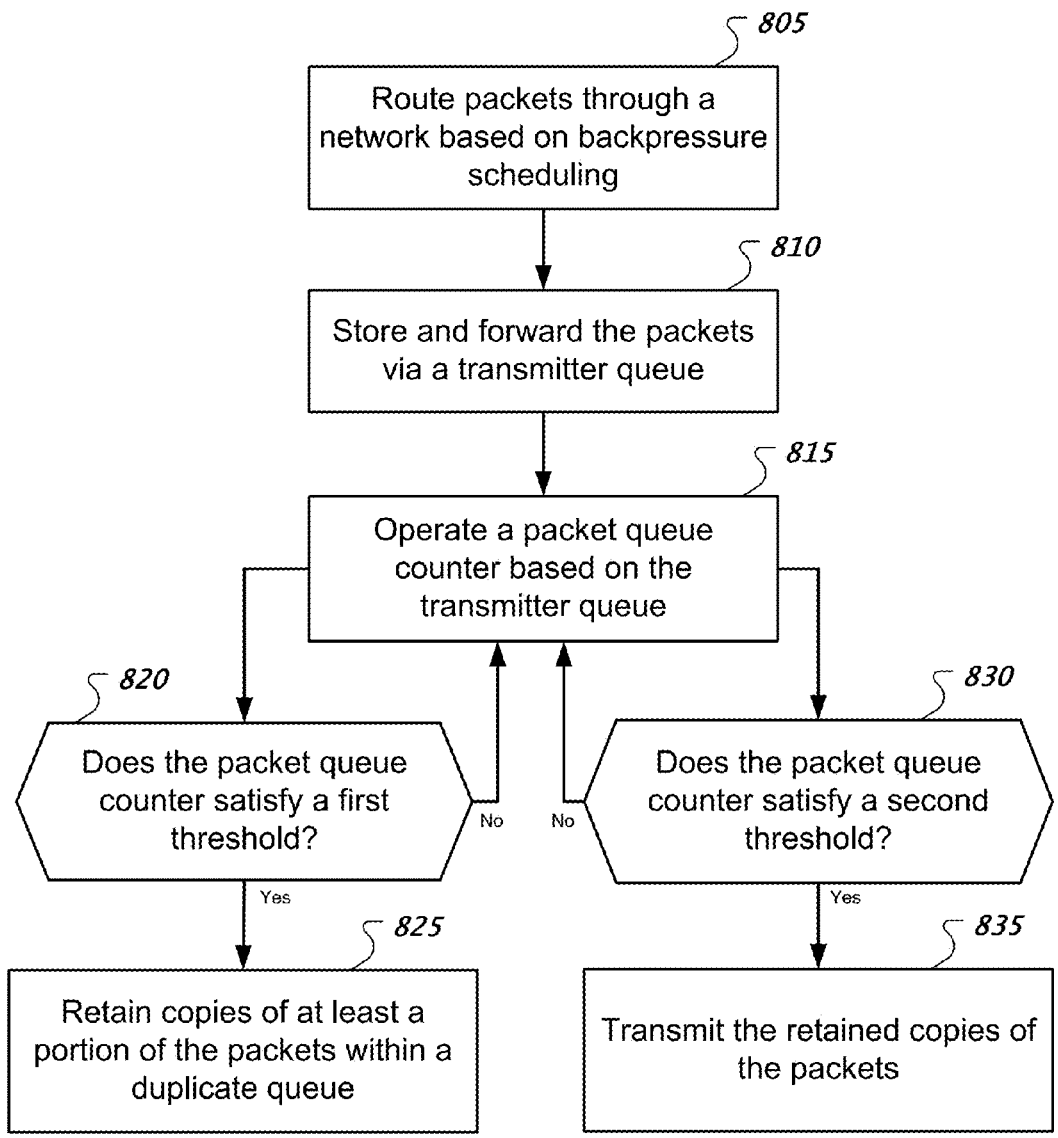
FIG. 8 shows a flowchart of an example of a process that uses BWAR.

FIG. 8 shows a flowchart of an example of a process that uses BWAR. At 805, the process routes packets through a network based on backpressure scheduling. Backpressure scheduling can use a store-and-forward protocol in which transmission decisions for the packets are based on queue differentials between a node and target recipient nodes. At 810, the process stores and forwards the packets via a transmitter queue. A BWAR-enabled node can include multiple transmitter queues and multiple duplicate buffers, with a pair of each corresponding to a different destination or flow. Thus, storing a packet at 810 can include identifying the destination of a packet and storing the packet in a transmitter queue that corresponds to the destination.

At 815, the process operates a packet queue counter based on the transmitter queue. Note that the process continuously operates the packet queue counter at 815. Operating the packet queue counter at 815, can include incrementing the counter when a packet is inserted into the transmitter queue. Operating the packet queue counter at 815, can include decrementing the counter when a packet is removed from the transmitter queue. In some implementations, the node can operate multiple packet queue counters based on respective transmitter queues.

At 820, the process determines whether the packet queue counter satisfies a first threshold. Determining whether the first threshold is satisfied, at 820, can include comparing a value of the packet queue counter with the first threshold and checking whether the value is below the first threshold. If the first threshold is satisfied, the process retains copies of at least a portion of the packets within a duplicate buffer at 825. Retaining the copies, at 825, can include copying a packet from the transmitter queue into the duplicate buffer when the number of packets in the transmitter queue is below the first threshold. In some implementations, a size of the duplicate buffer and the first threshold are each set to a value corresponding to a maximum link service rate in the network.

At 830, the process determines whether the packet queue counter satisfies a second threshold. If satisfied, the process transmits the retained copies of the packets at 835. Transmitting the retained copies can include transmitting each retained copy one at a time. Transmitting the retained copies can include giving a higher transmission priority to packets whose next hop node is their final destination in the network. In some implementations, with multiple transmitter queues, each of the transmitter queues can be associated with its own thresholds for retaining copies and transmitting retained copies. In some implementations, the process, for each packet of the packets to have a copy retained, checks that a total number of copies of the each packet is bounded by a constant. The constant can be adjustable to tune a tradeoff between energy and delay. In some implementations, the first threshold is referred to as a retention threshold and the second threshold is referred to as a duplicate transmission threshold. In some implementations, the retention threshold and the duplicate transmission threshold are different configurable parameters, that can be configured to the same value or to different values.

Figure 9:
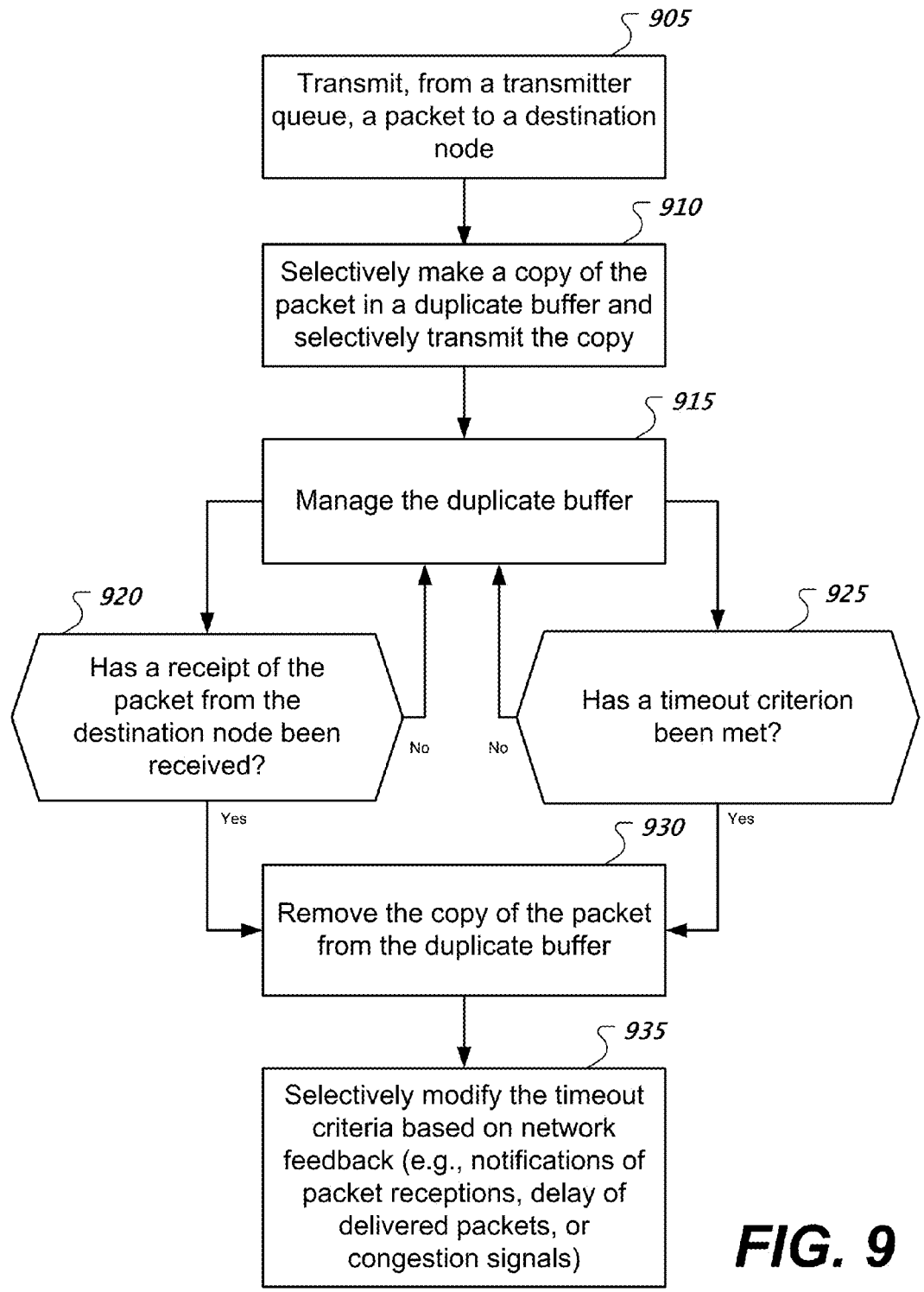
FIG. 9 shows a flowchart of another example of a process that uses BWAR.

FIG. 9 shows a flowchart of another example of a process that uses BWAR. At 905, the process transmits, from a transmitter queue, a packet to a destination node. At 910, the process selectively makes a copy of the packet in a duplicate buffer and selectively transmits the copy. For example, the process can make a copy of the packet based on the number of packets within the transmitter queue being below a threshold. At 915, the process manages the duplicate buffer. Such managing can include determining when to remove copies from the duplicate buffer. Such managing can include listening for network feedback. For example, at 920, the process can determine whether it has received a notification of receipt of the packet from the destination node. If the packet has been successfully received (e.g., an acknowledgement was received), the process can remove the copy of the packet from the duplicate buffer at 930. Further, managing, at 915, can include setting a timer to control timeouts. At 925, the process can determine whether a timeout criterion has been met. If the timeout criterion has been met, the process can remove the copy of the packet from the duplicate buffer at 930. At 935, the process can selectively modify the timeout criterion based on network feedback. Various examples of feedback include notifications of packet receptions, delay of delivered packets, or explicit congestion signals. Modifying the timeout criterion can include increasing a timeout value based on received feedback indicating that network congestion has increased. Further, the process can operate multiple timers for respective nodes and use different timeout criteria for the timers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
    routing, at a node comprising hardware, packets through a network based on backpressure scheduling, wherein the node comprises a transmitter queue and a duplicate buffer;
    when a number of packets in the transmitter queue satisfies a first threshold, retaining copies of at least a portion of the packets, wherein each of the retained copies comprises data that need to be forwarded through the network to a destination, and wherein each of the retained copies is a packet copied from the transmitter queue into the duplicate buffer when the number of packets in the transmitter queue is below the first threshold, wherein retaining the copies comprises copying the packet from the transmitter queue into the duplicate buffer when the number of packets in the transmitter queue is below the first threshold upon transmission of the packet from the transmitter queue; and
    once the number of packets in the transmitter queue satisfies a second threshold, transmitting the retained copies of the packets to perform the routing, wherein the second threshold is a predefined number of packets in the transmitter queue.

2. The method of claim 1, wherein the network comprises an intermittently connected mobile network, and the backpressure scheduling comprises a store-and-forward protocol in which transmission decisions for the packets are based on queue differentials between the node and target recipient nodes.

3. The method of claim 1, wherein the node comprises a plurality of transmitter queues and a plurality of duplicate buffers, with a pair of each corresponding to a different destination or flow, the first threshold comprises a first set of predefined thresholds for the plurality of transmitter queues, and the second threshold comprises a second set of predefined thresholds for the plurality of transmitter queues.

4. The method of claim 1, wherein the predefined number of packets is zero packets in the transmitter queue, and wherein the second threshold is satisfied when the number of packets in the transmitter queue is zero.

5. The method of claim 1, wherein a size of the duplicate buffer and the first threshold are each set to a value corresponding to a maximum link service rate in the network.

6. The method of claim 1, comprising:
    removing a retained copy of the retained copies from the duplicate buffer once a notification of receipt by a destination node is received.

7. The method of claim 1, comprising:
    giving higher priority to packets whose next hop node is their final destination in the network.

8. The method of claim 1, the method comprising:
    when a timeout criterion is met, removing the retained copies of the packets.

9. The method of claim 8, comprising:
    modifying the timeout criterion in accordance with feedback obtained from notifications of packet receptions, delay of delivered packets, or other congestion signals from the network.

10. The method of claim 1, comprising:
    for each packet of the packets to have a copy retained, checking that a total number of copies of the each packet is bounded by a constant.

11. The method of claim 10, wherein the constant is adjustable to tune a tradeoff between energy and delay.

12. An apparatus comprising:
    a memory comprising a transmitter queue and a duplicate buffer; and
    a processor configured to perform operations comprising:
        routing packets through a network based on backpressure scheduling;

when a number of packets in the transmitter queue satisfies a first threshold, retaining copies of at least a portion of the packets, wherein each of the retained copies comprises data that need to be forwarded through the network to a destination, and wherein each of the retained copies is a packet copied from the transmitter queue into the duplicate buffer when the number of packets in the transmitter queue is below the first threshold, wherein retaining the copies comprises copying the packet from the transmitter queue into the duplicate buffer when the number of packets in the transmitter queue is below the first threshold upon transmission of the packet from the transmitter queue; and once the number of packets in the transmitter queue satisfies a second threshold, transmitting the retained copies of the packets to perform the routing, wherein the second threshold is a predefined number of packets in the transmitter queue.

13. The apparatus of claim 12, wherein the network comprises an intermittently connected mobile network, and the backpressure scheduling comprises a store-and-forward protocol in which transmission decisions for the packets are based on queue differentials between the apparatus and target recipient nodes.

14. The apparatus of claim 12, wherein the memory comprises a plurality of transmitter queues and a plurality of duplicate buffers, with a pair of each corresponding to a different destination or flow, the first threshold comprises a first set of predefined thresholds for the plurality of transmitter queues, and the second threshold comprises a second set of predefined thresholds for the plurality of transmitter queues.

15. The apparatus of claim 12, wherein the predefined number of packets is zero packets in the transmitter queue, and wherein the second threshold is satisfied when the number of packets in the transmitter queue is zero.

16. The apparatus of claim 12, wherein a size of the duplicate buffer and the first threshold are each set to a value corresponding to a maximum link service rate in the network.

17. The apparatus of claim 12, wherein the operations comprise:
removing a retained copy of the retained copies from the duplicate buffer once a notification of receipt by a destination node is received.

18. The apparatus of claim 12, wherein the operations comprise:
giving higher priority to packets whose next hop node is their final destination in the network.

19. The apparatus of claim 12, wherein the operations comprise:
when a timeout criterion is met, removing the copies of the packets.

20. The apparatus of claim 19, wherein the operations comprise:
modifying the timeout criterion in accordance with feedback obtained from notifications of packet receptions, delay of delivered packets, or other congestion signals from the network.

21. The apparatus of claim 12, wherein the operations comprise:
for each packet of the packets to have a copy retained, checking that a total number of copies of the each packet is bounded by a constant.

22. The apparatus of claim 21, wherein the constant is adjustable to tune a tradeoff between energy and delay.

23. A system comprising:
multiple intermittently connected mobile devices forming an intermittently connected mobile network,
wherein a mobile device in the network comprises a processor and a memory, and
wherein the memory stores a program configured to cause the processor to (i) route packets through the network based on backpressure scheduling using a transmitter queue, (ii) retain copies of at least a portion of the packets when a number of packets in the transmitter queue satisfies a first threshold, each of the retained copies comprising data that need to be forwarded through the network to a destination, each of the retained copies being a packet copied from the transmitter queue into a duplicate buffer when the number of packets in the transmitter queue is below the first threshold upon transmission of the packet from the transmitter queue, and (iii) transmit the retained copies of the packets to perform the routing once the number of packets in the transmitter queue satisfies a second threshold, wherein the second threshold is a predefined number of packets in the transmitter queue.

24. The system of claim 23, wherein the mobile device comprises a plurality of transmitter queues and a plurality of duplicate buffers, with a pair of each corresponding to a different destination or flow, the first threshold comprises a first set of predefined thresholds for the plurality of transmitter queues, and the second threshold comprises a second set of predefined thresholds for the plurality of transmitter queues.

25. The system of claim 23, wherein the predefined number of packets is zero packets in the transmitter queue, and wherein the second threshold is satisfied when the number of packets in the transmitter queue is zero.

26. An apparatus comprising:
a memory comprising a transmitter queue and a duplicate buffer; and
a processor coupled with the memory, wherein the processor is configured to perform operations comprising:
routing packets through a network based on backpressure scheduling;
when a number of packets in the transmitter queue satisfies a first threshold, retaining one or more copies of one or more of the packets, wherein each of the retained copies comprises data that need to be forwarded through the network to a destination node, and wherein each of the one or more retained copies is a packet copied from the transmitter queue into the duplicate buffer when the number of packets in the transmitter queue is below the first threshold; and
once the number of packets in the transmitter queue satisfies a second threshold, transmitting at least a portion of the one or more retained copies to perform the routing,
wherein a size of the duplicate buffer is based on a maximum link service rate in the network, and
wherein the first threshold is based on the maximum link service rate in the network.

27. The apparatus of claim 26, wherein the operations comprise removing a retained copy of the one or more retained copies from the duplicate buffer once a notification of receipt by the destination node is received.

28. The apparatus of claim 26, wherein the operations comprise:
when a timeout criterion is met, removing the one or more retained copies; and modifying the timeout criterion in accordance with feedback obtained from notifications of packet receptions, delay of delivered packets, or other congestion signals from the network.

29. The apparatus of claim 26, wherein the second threshold is zero packets in the transmitter queue, and wherein the second threshold is satisfied when the number of packets in the transmitter queue is zero.

30. The apparatus of claim 26, wherein the network comprises an intermittently connected mobile network, and the backpressure scheduling comprises a store-and-forward protocol in which transmission decisions for the packets are based on queue differentials between the apparatus and target recipient nodes.

31. The apparatus of claim 26, wherein the memory comprises a plurality of transmitter queues and a plurality of duplicate buffers, with a pair of each corresponding to a different destination or flow, the first threshold comprises a first set of predefined thresholds for the plurality of transmitter queues, and the second threshold comprises a second set of predefined thresholds for the plurality of transmitter queues.

* * * * *